MULTIFREQUENCY SIGNAL GENERATOR
Filed July 8, 1968
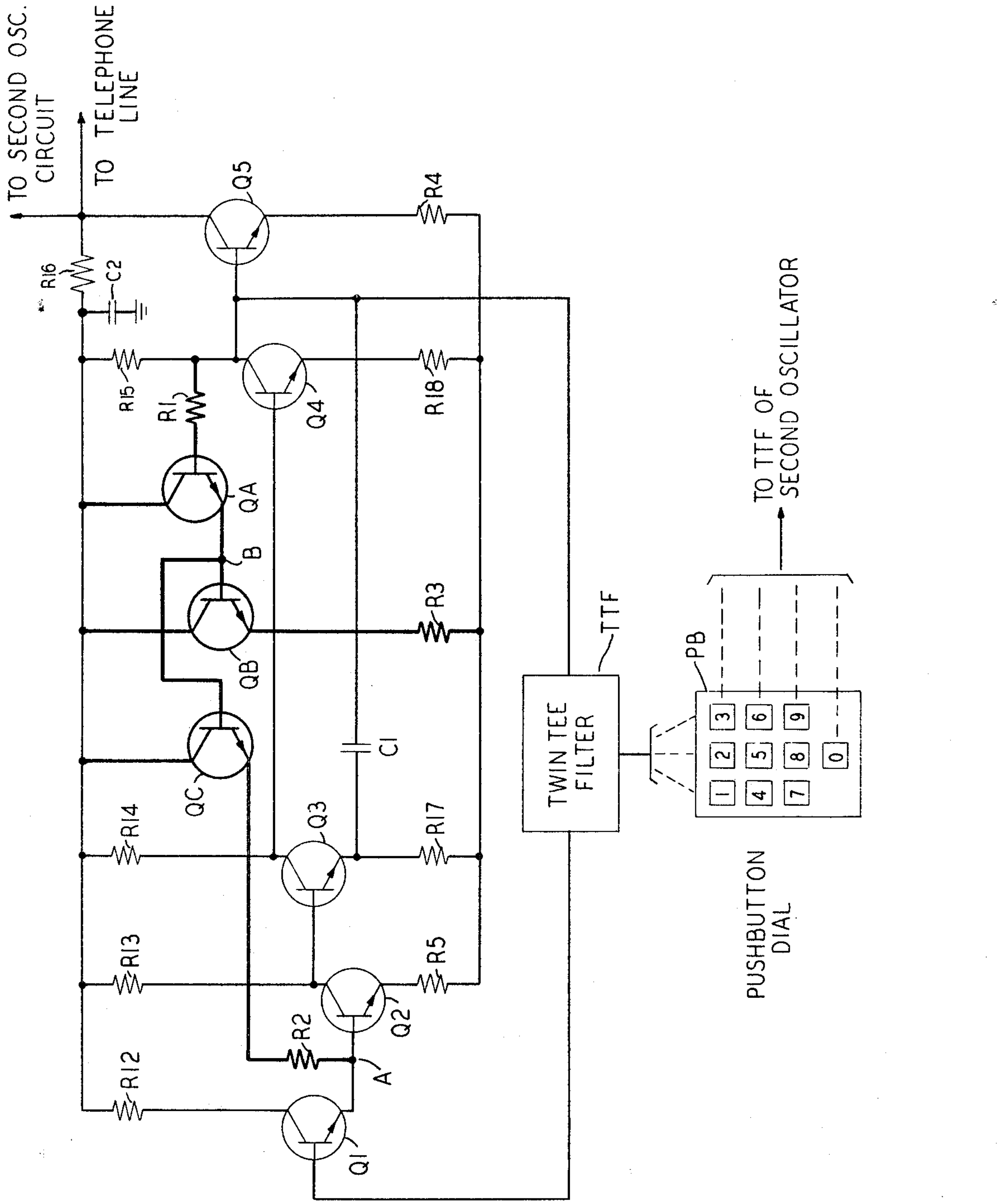
INVENTOR
T. N. RAO
BY [signature]
ATTORNEY 3,518,572
MULTIFREQUENCY SIGNAL GENERATOR
Tadikonda N. Rao, Plainfield, N.J., assignor to Bell Telephone Laboratories, Incorporated, Murray Hill, N.Y., a corporation of New York
Filed July 8, 1968, Ser. No. 743,142
Int. Cl. H03b 5/26
U.S. Cl. 331—109 9 Claims

ABSTRACT OF THE DISCLOSURE

A conventional transistor oscillator circuit is made wholly compatible with integrated circuit technology by employing a limiter circuit utilizing circuit components that can be incorporated in the monolithic chip containing the amplifier. Limiting is achieved by comparing A.C. signals in two identical subcircuits.

BACKGROUND OF THE INVENTION

Field of the invention

This invention relates to transistor oscillator circuits and more particularly to limiter circuits associated therewith.

Description of the prior art

Multifrequency signal generators with the capability of producing unique coincident pairs of oscillatory signal bursts in response to the actuation of a pushbutton or other manually actuated switch are well known, as disclosed for example by L. A. Meacham and F. West in U.S. Pat. No. 3,184,554, issued May 18, 1965.

One form of the arrangement shown by Meacham and West is employed commercially as a pushbutton operated dial for a telephone set, the Bell System version of which is known as the Touch-Tone® telephone. Each signal pair generated by the dial of a pushbutton dial telephone includes one signal from a relatively high frequency band and one signal from a relatively low frequency band, and each unique frequency combination is indicative of a dialed digit in accordance with a frequency code.

Initially, the generation of pushbutton dial telephone tone signals was effected by a single transistor oscillator with an inductively coupled feedback circuit. Certain of the frequency determining elements in the feedback circuit were selectively switched into and out of the circuit to obtain the desired frequency combinations. Improvements in multifrequency signal generator circuits of this general type have included the use of two substantially separate transistor oscillators, which has helped to reduce interference between the generated frequencies, and the employment of twin-T R–C filters in the amplifier feedback path, which has eliminated the need for inductors and has thus made the circuits more compatible with integrated circuit fabrication techniques. A circuit of this latter type has been disclosed by R. L. Breeden and R. M. Rickert in a copending application Ser. No. 487,138 filed Sept. 14, 1965.

Despite the improvements indicated, multifrequency signal generating circuits of the type employed in pushbutton telephone sets are substantially less than ideal from the standpoint of both fabrication and operation. One of the problems that remains unsolved relates to the fact that the circuits are still not fully compatible with the latest integrated circuit fabrication techniques, particularly those techniques dealing with silicon chips. One specific example of this lack of compatibility concerns the oscillator limiter circuit. Heretofore, conventional limiting means have been employed which typically involve the use of limiting diodes and at least one large coupling capacitor. Although some types of diode circuit devices are amenable to silicon chip technology and thus integratable with the circuit elements of the amplifier chip, such fabrication techniques are not commercially feasible for diodes of the type employed heretofore in limiter circuits. Moreover, the integration of large magnitude capacitors in silicon chips is still well beyond the present state of the art.

The absence of complete compatibility with the fabrication techniques of integrated circuitry not only denies otherwise inherent advantages in terms of both circuit economy and reliability, but also denies the related equipment designer, the designer of a telephone handset for example, the full flexibility of physical design parameters that would necessarily accompany the use of a circuit that occupies only a small fraction of the space required by conventional arrangements.

An additional problem in prior art multifrequency generators of the type indicated also relates to the oscillator limiting function and specifically to the fact that in prior art limiters the degree of limiting is influenced unduly by varations in loop length (equivalent to variations in B+ supply) and by variations in temperature. Moreover, it has been found in the prior art that temperature induced changes in the characteristics of certain limiting circuits in turn induce variations in the oscillator frequency.

A broad object of the invention is to provide solutions for the problems indicated.

SUMMARY OF THE INVENTION

The stated problems and related problems are solved in accordance with the principles of the invention by the employment of a unique limiter circuit in the amplifier portion of a transistor oscillator, all of the circuit elements of the limiter being readily integratable with the silicon chip embodying the active elements of the amplifier or being integratable with associated thin film employed for certain of the inactive elements of the amplifier. In accordance with the invention, adverse effects on the limiting function in response to temperature changes differing from those temperature changes to which the active elements of the amplifier are exposed is avoided. Specifically, the temperature-sensitive elements of both the amplifier and the limiting circuit have been so selected, in accordance with the invention, to permit their incorporation in a common silicon chip and thus, all such elements share precisely the same environment, including temperature.

In accordance with one feature of the invention, the possibility of effecting oscillator frequency by temperature induced effects in the limiting circuit is also avoided in that the elements of the limiting circuit are no longer directly associated with the frequency determining elements of the oscillator.

A basic aspect of an oscillator limiting circuit in accordance with the invention is that limiting is achieved by comparing A.C. signals in two distinct but interconnected subcircuits. The two subcircuits are made identical, and hence D.C. level changes which arise from temperature and loop length (B+) variations have little or no influence on the limiting process.

DESCRIPTION OF THE DRAWING

The single figure is a schematic circuit diagram of a circuit in accordance with the invention.

DESCRIPTION OF AN EMBODIMENT

In the figure the features of the invention are shown embodied in an oscillator circuit of the type employed as a dial signal generator in certain pushbutton dail telephone sets. These sets typically employ two identical oscillators, one being used for the generation of any one of four signals in a relatively low frequency band, and the other being used for the generation of any one of four signals in a relatively high frequency band. In the interest of simplification and clarity, only a single oscillator circuit is shown in the drawing; a complete dual oscillator circuit of this general type is shown by Breeden and Rickert in the copending application cited above.

In the figure, the limiting circuit in accordance with the invention is shown in heavy lines. The conventional portion of the circuit comprises transistors Q1 through Q5, Q1 being the input stage and Q5 being the output stage. Resistors R12 through R18 together with resistors R4 and R5 perform conventional loading or biasing functions. Capacitor C1 provides a stabilizing feedback path between the second and third intermediate amplifier stages comprising transistors Q3 and Q4. The twin-T filter TTF, the frequency determining portion of the circuit, is fully conventional and employs only resistive and capacitive circuit elements. The 180 degrees phase shift thus introduced between the collector of transistor Q4 and the base of transistor Q1 ensures the generation of the oscillatory signal.

The particular frequency of oscillation is determined by the operation of one of the pushbuttons in the pushbutton dial PB, which initiates a switching action to connect a particular resistor, not shown, in the filter TTF which corresponds to the number dialed in terms of the usual frequency code. Although the second oscillator circuit is not shown, the connecting paths thereto are indicated.

The limiting circuit in accordance with the invention may be viewed as a negative feedback path extending from the collector of transistor Q4 to the base of transistor Q2 at point A. The feedback signal path includes the resistor R1, the base-to-emitter path of transistor QA, the base-to-emitter path of transistor QC and the resistor R2.

In following the operation of the limiting circuit, it is helpful to consider two subcircuits, the first of which comprises transistors Q1 and Q2, and the second of which comprises transistors QA and QB. In accordance with the invention, transistors QA and QB are biased in precisely the same way as transistors Q1 and Q2. Identical biasing is assured in part by choosing the magnitude of the resistor R1 to be substantially equal to the average series resistance of the filter TTF. Additionally, the magnitudes of the resistors R3 and R5 are also made substantially equal, and the magnitude of resistor R2 is substantially equal to the magnitude of the resistor R1. In normal operation, a telephone is subject to varying loop lengths which is to say that the distance to the central office or power supply point varies and accordingly biasing level also varies. With the biasing arrangement of the invention however, points A and B are held at substantially the same D.C. potential irrespective of loop length. In addition to loop length, temperature variations between points A and B are another source of possible difference in biasing levels. In accordance with the invention, however, all the transistors of the amplifier, transistors Q1 through Q5, and all of the transistors of the limiting circuit, transistors QA, QB and QC, are incorporated in a common silicon chip and thus, all these elements experience precisely the same environment and the same temperature. Excellent tracking between points A and B is thus ensured irrespective of either changing loop length or changing temperature. It is the difference in signal potential between points A and B that establishes the degree of limiting.

During operation, the signal voltage at points A and B are out of phase. During the positive peaks of the signal at point B, transistor QC conducts and injects an out of phase current pulse into the base of transistor Q2. This action results in the limiting of negative peaks of the wave form at the collector of transistor Q5, the oscillator output point. The resistor R2 limits the amount of negative feedback that can be applied to the base of transistor Q2. The amplitude of the signal at the collector of transistor Q4 is thus controlled, in accordance with the invention, primarily by the base-to-emitter voltage drop of transistor QC.

It is to be understood that the embodiment described herein is merely illustrative of the principles of the invention. Various modifications thereto may be effected by persons skilled in the art without departing from the spirit and scope of the invention.

What is claimed is:

1. An oscillatory signal generator comprising, in combination, a multistage transistor amplifier including an input stage, an output stage and a plurality of intermediate stages, a positive feedback path connecting the output of one of said intermediate stages to the input of said input stage, said path including only resistive and capacitive elements arranged in notch filter configuration, a limiter circuit comprising a network of transistors interconnecting the output of said last named intermediate stage to the input of a first intermediate stage, the transistor of said limiter circuit and the transistors of said amplifier being incorporated in a single silicon chip, whereby the limiting function is made substantially immune to temperature changes.

2. Apparatus in accordance with claim 1 wherein two transistors of said network form a first subcircuit, wherein said input stage of said amplifier together with said first intermediate stage of said amplifier form a second subcircuit, said amplifier, said feedback path and said limiter circuit including means for identically biasing said first and second subcircuits whereby the limiting function is made substantially immune to changes in biasing level.

3. Apparatus in accordance with claim 2 wherein said biasing means includes a first resistive element connecting the output of the final one of said intermediate stages to the base electrode of one of said two transistors in said network, the magnitude of said resistive element being substantially equal to the magnitude of the series resistance presented by said filter.

4. Apparatus in accordance with claim 3 wherein said network includes a third transistor, a second resistive element connecting the emitter electrode of said third transistor to the input point of said first intermediate stage, said first and second resistive elements being substantially identical in magnitude, and means connecting the emitter electrode of said last named one of said two transistors to the base electrode of said third transistor.

5. Apparatus in accordance with claim 4 wherein the collector-emitter path of the other of said two transistors of said first subcircuit is connected between two points in said amplifier, and wherein said base electrode of said last named other transistor is connected to the emitter electrode of said one transistor of said first subcircuit, a third resistive element connected between the emitter electrode of said last named other transistor and one of said last named points, and a fourth resistive element connected between the emitter electrode of the transistor of said first intermediate stage and said last named point, said third and fourth resistive elements being of substantially the same magnitude.

6. In a multifrequency signal generator for dial signal generation in a telephone set wherein each of two oscillator circuits includes a respective multistage transistor amplifier and a respective R–C twin-T filter in the feedback path thereof, the improvement comprising, a limiting circuit employing a network of transistors connected from a point between the first and second stages of said amplifier and a point between the final and next to final stages of said amplifier, the transistors of said limiting circuit and the transistors of said amplifier being incorporated in a common silicon chip, whereby the limiting function is made substantially immune to temperature changes.

7. Apparatus in accordance with claim 1 wherein two transistors of said network form a first subcircuit, wherein the two transistors comprising said first and second stages of said amplifier form a second subcircuit, said amplifier, said feedback path and said limiter circuit including means for identically biasing said first and second subcircuits, whereby the limiting function is made substantially immune to changes in biasing level, the degree of limiting applied by said limiting circuit being effected by a comparison of the signal voltage at a point between the first and second stages of said amplifier with the signal voltage at a point between the two transistors of said first subcircuit.

8. Apparatus in accordance with claim 7 wherein said biasing means includes a first resistive element connecting the output of said next to final stage of said amplifier with the base electrode of one of said transistors of said first subcircuit, said first resistive element being substantially equal in magnitude to the series resistance presented by said filter.

9. Apparatus in accordance with claim 8 wherein said limiter circuit further includes means connecting the emitter electrode of said one of said transistors to the base electrode of the other one of said transistors of said first subcircuit, a second resistive element having one terminal thereof connected to the emitter electrode of said other one of said transistors, a third resistive element having one terminal thereof connected to the emitter electrode of the transistor forming said second stage of said second subcircuit, said second and third resistive elements being substantially equal in magnitude and having the free terminals thereof connected to a common point.

References Cited

UNITED STATES PATENTS 3,424,870 1/1969 Breeden et al. ------ 331—142

JOHN KOMINSKI, Primary Examiner

U.S. Cl. X.R.

331—110, 142